J. E. HALE.
TIRE.
APPLICATION FILED APR. 7, 1913.

1,145,063.

Patented July 6, 1915.

Witnesses

Inventor
James E. Hale
By C. E. Humphrey
Attorney

UNITED STATES PATENT OFFICE.

JAMES E. HALE, OF AKRON, OHIO, ASSIGNOR TO THE GOODYEAR TIRE AND RUBBER COMPANY, OF AKRON, OHIO, A CORPORATION OF OHIO.

TIRE.

1,145,063.

Specification of Letters Patent.

Patented July 6, 1915.

Application filed April 7, 1913. Serial No. 759,512.

*To all whom it may concern:*

Be it known that I, JAMES E. HALE, a citizen of the United States, residing at Akron, in the county of Summit and State of Ohio, have invented new and useful Improvements in Tires, of which the following is a specification.

This invention relates to improvements in tires for vehicle wheels, and the objects accomplished are a reduction in the cost of producing a tire by the utilization of a comparatively cheap material in the base portion of the tire in which the usual resiliency attending the use of rubber is comparatively unimportant and the base of the tire is stiffened.

A further object is to provide the base of the tire with a slightly stretchable circumferentially-extending series of elements the tendency of which is, when the tire is formed annularly and placed on a wheel rim, to contract so as to cause the inner face of the tire to more firmly grasp the rim on which it is mounted.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modification can be resorted to which come within the scope of the claim hereunto appended.

Figure 1:
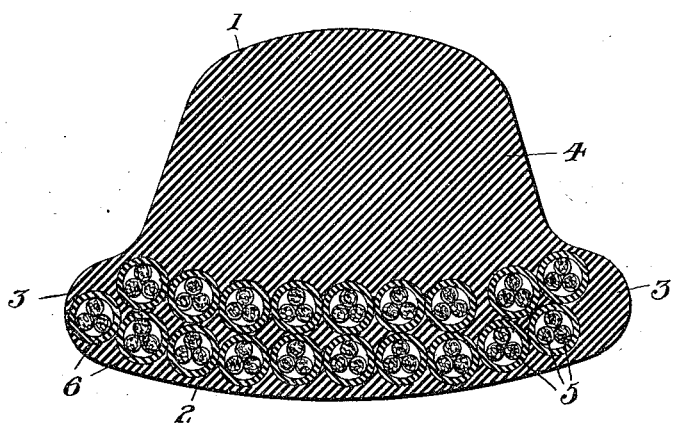
Figure 2:
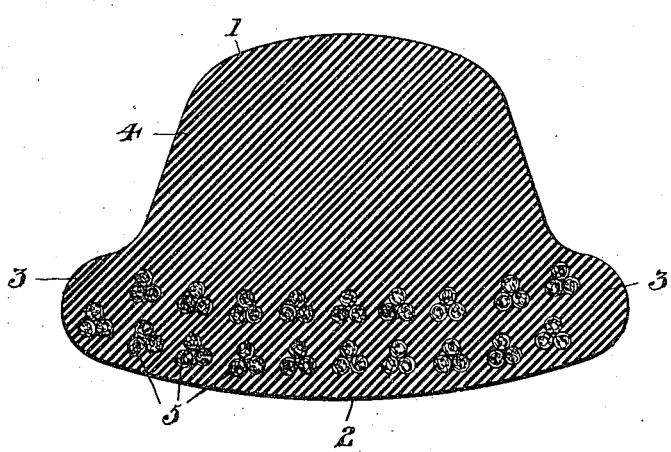

In the drawings in which similar reference numerals indicate like parts in the different figures, Figure 1, is a transverse sectional view of a tire embodying this invention in the process of manufacture; and, Fig. 2, is a view similar to Fig. 1 of a completed tire.

The tire in connection with which this invention is employed is usually of the solid type and embodies a tread 1 and a base 2, the latter fashioned to fit within any preferred type of rim, and in the drawings is shown a base provided with lateral beads 3 to be received in the inturned clencher flanges of a rim. The body 4 of the tire is usually constructed of ordinary vulcanized soft rubber.

The base of a tire embodying this invention is made up or largely composed of a series of circumferentially-extending ropes 5 each inclosed previous to the manufacture of the tire in a tube 6 composed of vulcanizable gum compound. In ordinary practice, these tubes containing the ropes will be laid as closely together in the base of the tire as possible, even more closely than shown in the drawings, so as to approximately fill the entire base of the tire and extend outwardly into the beads 3. The balance of the tire is made up of the ordinary vulcanizable gum compound which will produce soft rubber and the tire is placed in the mold for curing, during which operation the tubular members 6 surrounding the ropes 5 will become merged into or united with the rubber of the body of the tire so as to form a homogeneous uniform body of vulcanized soft rubber with the ropes 5 separated from each other and each rope surrounded by the enveloping body of rubber of which the tire body is composed; the incorporation of the tube-like members 6 in the body of the tire causing the former to lose their identity as tubes and become a unitary uniform mass, with the result that the ropes will be spaced from each other and fill substantially as nearly as possible the base of the tire, as shown in Fig. 2.

In practice, it is preferable to place the rope in a spiral manner in the base of the tire so that one rope wound continuously will form the reinforced portion of the base of the tire. The incorporation of the rope of the base of the tire gives a rigidity to the base where a large amount of soft rubber is not necessary to add to the usefulness of the tire thereby saving the cost of expensive production, adding rigidity to the tire, and making the tire slightly stretchable when placing it on the wheel rim to thereby cause it to grasp the outer face of the rim on which it is seated.

As is well known in the rubber tire art, no advantage, so to speak, is accomplished by forming the base portion of a tire of soft rubber, as distortion of the tread is not carried downwardly to the base and hence, a base of more rigid material such as rope, as shown and described, accomplishes equally good results and fulfils the purpose of reducing the cost of production.

I claim:

A solid tire having its base provided with lateral beads, and a plurality of transverselydisposed rows of circumferentially arranged, substantially non-elastic reinforcing members embedded in the base and having a terminal reinforcing member of each row extending into a bead, the terminal member of one row extending into one bead and the terminal member of the other row extending into the other bead, and being held in position solely by adhesion with the material of the tire, each of the members being composed of a plurality of units and each unit exerting an independent resistance to compression.

In testimony whereof I have hereunto set my hand in presence of two subscribing witnesses.

JAMES E. HALE.

Witnesses:
W. B. HAMLEN,
R. M. LEMING.